(12) United States Patent
Paben (10) Patent No.: US 10,683,197 B1
(45) Date of Patent: Jun. 16, 2020

(54) FLOW METER WATER CAP SYSTEM

(71) Applicant: Wesley Paben, Ft. Worth, TX (US)

(72) Inventor: Wesley Paben, Ft. Worth, TX (US)

(*) Notice: Subject to any disclaimer, the term of this patent is extended or adjusted under 35 U.S.C. 154(b) by 0 days.

(21) Appl. No.: 16/437,522

(22) Filed: Jun. 11, 2019

(51) Int. Cl.
| | | |
|---|---|---|
| *B67D 1/08* | (2006.01) | |
| *B65D 41/04* | (2006.01) | |
| *B65D 47/06* | (2006.01) | |
| *B65D 51/24* | (2006.01) | |

(52) U.S. Cl.
CPC ........... *B67D 1/0855* (2013.01); *B65D 41/04* (2013.01); *B65D 47/068* (2013.01); *B65D 51/24* (2013.01); *B65D 2203/10* (2013.01); *B65D 2251/20* (2013.01); *B65D 2547/063* (2013.01)

(58) Field of Classification Search
CPC .... B67D 1/0855; B65D 41/04; B65D 47/068; B65D 51/24; B65D 2203/10; B65D 2251/20; B65D 2547/063
USPC .......................................................... 222/40
See application file for complete search history.

(56) References Cited

U.S. PATENT DOCUMENTS

| | | | | |
|---|---|---|---|---|
| RE31,434 E | * | 11/1983 | Reilly | G01F 11/00 222/211 |
| 5,816,448 A | * | 10/1998 | Kobold | B67D 1/1211 222/36 |
| 6,036,055 A | * | 3/2000 | Mogadam | B67D 3/0006 222/23 |
| 6,212,959 B1 | * | 4/2001 | Perkins | G01F 1/115 73/861.74 |
| 7,900,799 B2 | * | 3/2011 | Kuzar | B67D 3/0006 222/40 |
| 8,925,769 B2 | * | 1/2015 | Zapp | B65D 25/48 222/1 |
| 9,506,798 B2 | | 11/2016 | Saltzgiver | |
| D775,893 S | | 1/2017 | Buckley | |
| 9,677,923 B1 | | 6/2017 | Daneyshar | |
| 9,821,997 B2 | * | 11/2017 | Zapp | B67D 3/0006 |
| 10,078,003 B2 | * | 9/2018 | Gurumohan | H04W 4/80 |
| 10,231,567 B2 | * | 3/2019 | Perrelli | B67D 1/0078 |
| 2004/0137140 A1 | * | 7/2004 | Childers | A61J 3/00 427/2.1 |
| 2005/0033532 A1 | * | 2/2005 | Mogadam | B67D 1/00 702/55 |
| 2009/0114675 A1 | * | 5/2009 | Kuzar | B67D 3/0006 222/40 |
| 2009/0134183 A1 | * | 5/2009 | Odishoo | B65D 55/0809 222/30 |

(Continued)

*Primary Examiner* — Patrick M. Buechner
*Assistant Examiner* — Michael J. Melaragno (57) ABSTRACT

A flow meter water cap system for tracking water consumption includes a bottle cap apparatus and at least one bottle vessel. The bottle cap apparatus comprises a cap body having a central spout extension and a principal aperture extending therethrough. A cap top is slidingly coupled around the spout extension and is selectively engageable with a cylindrical stopper to seal and alternatively unseal the principal aperture. An electronics housing is coupled within a thread depression of the cap body and has a flow aperture aligned with the principal aperture. A flow meter, a CPU, a transceiver, and a battery are coupled within the cavity. The flow meter is configured to detect a volume of fluid flowing through the flow aperture and the transceiver shares information from the flow meter and the battery. Each bottle vessel comprises a bottle body having a neck that is selectively engageable with the cap body.

13 Claims, 5 Drawing Sheets

(56) References Cited

U.S. PATENT DOCUMENTS

| | | | |
|---|---|---|---|
| 2011/0166699 A1* | 7/2011 | Palmquist | B67D 1/1234 700/236 |
| 2013/0222135 A1* | 8/2013 | Stein | A61J 7/0409 340/540 |
| 2013/0275075 A1 | 10/2013 | Johnson | |
| 2014/0149265 A1* | 5/2014 | Kundra | H04B 7/022 705/28 |
| 2014/0367411 A1* | 12/2014 | Zapp | B67D 3/0006 222/40 |
| 2015/0101405 A1* | 4/2015 | Gorenflo | G01F 23/0061 73/290 V |
| 2015/0108026 A1 | 4/2015 | Azimi | |
| 2015/0182797 A1 | 7/2015 | Wernow | |
| 2015/0355012 A1* | 12/2015 | Gurumohan | A47G 19/00 702/55 |
| 2016/0003615 A1 | 1/2016 | Biswas | |
| 2016/0025545 A1* | 1/2016 | Saltzgiver | G01F 23/263 73/304 C |
| 2016/0146659 A1* | 5/2016 | Saltzgiver | G01F 23/263 206/459.1 |
| 2016/0178426 A1* | 6/2016 | Gurumohan | G01F 23/2962 73/290 V |
| 2017/0067770 A1 | 3/2017 | Sun | |
| 2017/0238744 A1* | 8/2017 | Sweeney | A47G 19/2227 |
| 2019/0034999 A1* | 1/2019 | Sant | G01F 1/58 |

\* cited by examiner

FLOW METER WATER CAP SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98.

The disclosure and prior art relates to water bottles and more particularly pertains to a new water bottle for tracking water consumption.

BRIEF SUMMARY OF THE INVENTION

An embodiment of the disclosure meets the needs presented above by generally comprising a bottle cap apparatus and at least one bottle vessel. The bottle cap apparatus comprises a cap body having a top side and a bottom side. The bottom side has a circular thread depression extending towards the top side. An inner face of the thread depression is threaded. The top side has a central spout extension and a principal aperture extending from the bottom side through the spout extension. A cylindrical stopper coupled to the cap body, the stopper being coupled within the principal aperture and extending above the spout extension. A cap top is slidingly coupled around the spout extension and is selectively engageable with the stopper to seal and alternatively unseal the principal aperture when the cap top is in a closed position and an alternative open position, respectively. A top face of an electronics housing is coupled to the bottom side within the thread depression and has a flow aperture extending from a bottom face through the top face aligned with the principal aperture. The electronics housing has an annular cavity between the top face and the bottom face around the flow aperture. A flow meter is coupled to the electronics housing. The flow meter comprises a sensor body, an axle coupled to the sensor body, and a shredder bar coupled to the axle. The sensor body is coupled within the cavity and the axle is rotatingly coupled within an axle aperture extending from the cavity through the electronics housing into the flow aperture. The shredder bar is disposed within the flow aperture. The flow meter is configured to detect a volume of fluid flowing through the flow aperture from the bottom face to the top face. A CPU, a transceiver, and a battery are coupled within the cavity and are in operational communication with each other and with the flow meter. A charge port is coupled to the electronics housing and extends from the cavity through to the bottom face. The charge port is in operational communication with the battery. The transceiver is configured to be in wireless communication with an extrinsic electronic device to share information from the flow meter and the battery. Each bottle vessel comprises a bottle body having a neck extending from a top section and a bottle aperture extending through the neck. The neck is externally threaded and is selectively engageable with the thread depression of the cap body. The bottle body is configured to store a liquid content and release said content through the flow aperture when the cap body is engaged and the cap top is in the open position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 5 thereof, a new water bottle embodying the principles and concepts of an embodiment of the disclosure and generally designated by the reference numeral 10 will be described.

As best illustrated in FIGS. 1 through 5, the flow meter water cap system 10 generally comprises a bottle cap apparatus 12 and at least one bottle vessel 14. The bottle cap apparatus 12 comprises a cap body 16 having a top side 18 and a bottom side 20. The bottom side 20 has a circular thread depression 22 extending towards the top side 18 and an inner face 24 of the thread depression is threaded. The top side 18 has a central spout extension 26 and a principal aperture 28 extending from the bottom side 20 through the spout extension 26. The spout extension 26 has a recessed lower section 30 adjacent the top side 18. The principal aperture 28 has a lower portion 32 extending from the thread depression 22 and an upper portion 34 extending from the lower portion 32 to an upper rim 36 of the spout extension. The upper portion 34 is wider than the lower portion 32 and together define a shelf 38. A cylindrical stopper 40 is coupled to the cap body 16 to the shelf 38 within the principal aperture 28 and has an outer diameter less than a diameter of the upper portion 34. The stopper 40 has a porous lower wall 42, an outer lip 44 aligning with the upper rim 36 of the spout extension, and a solid, closed upper wall 46 extending past the spout extension 26.

Figure 4:
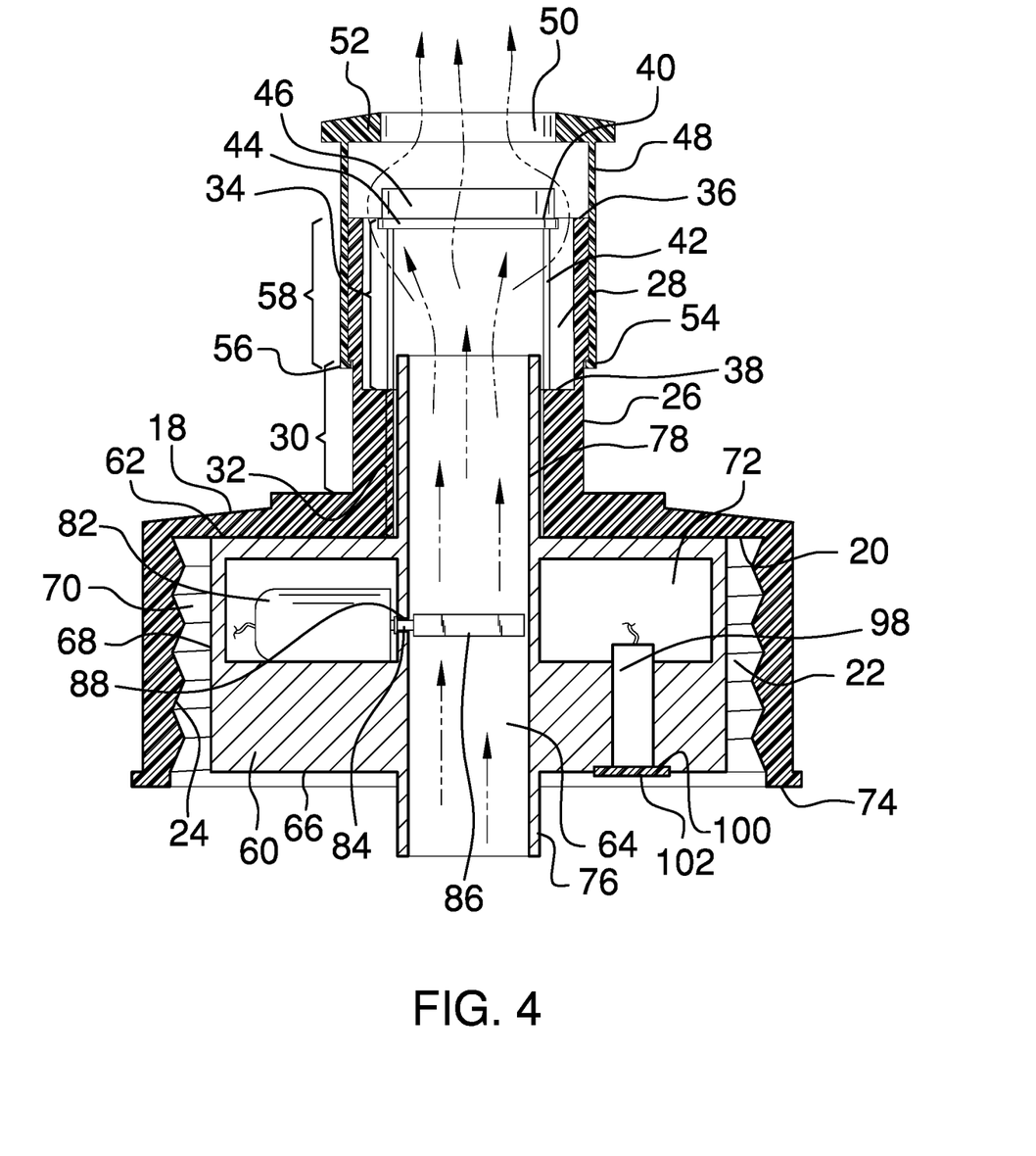
FIG. 4 is a cross-sectional view of an embodiment of the disclosure along line 4-4 of FIG. 3.

A cap top 48 is slidingly coupled around the spout extension 26 and is selectively engageable with the stopper 40 to seal and alternatively unseal the principal aperture 28 when the cap top 48 is in a closed position and an alternative open position, respectively. A central top aperture 50 of a top end 52 of the cap top has a diameter conforming to a diameter of the upper wall 46 and selectively receives the upper wall 46 such that the top end 52 rests on, and extends between, the outer lip 44 and the upper rim 36 of the spout extension when the cap top 48 is in the closed position. The cap top 48 in the closed position is thus configured to block the flow of water through the principal aperture 28 and in the open position is configured to allow the flow of water through the lower wall 42, between the upper portion 34 and the outer lip 44, and out the central top aperture 50. An inner lip 54 extends from a bottom end 56 of the cap top to slidingly engage the recessed lower section 30 to contact the top side 18 with the cap top 48 in the closed position and to contact an upper section 58 of the spout extension with the cap top 48 in the open position. The inner lip 54 thus controls the range of motion of the cap top 48 and preventing the cap top 48 from accidently disengaging the spout extension 26.

An electronics housing 60 is coupled to the cap body 16 with a top face 62 coupled to the bottom side 20 within the thread depression 22. A flow aperture 64 extends from a bottom face 66 through the top face 62 and is aligned with the principal aperture 28. A cylindrical outer face 68 defines an annular bottle channel 70 with the inner face 24 of the thread depression. The electronics housing 60 has an annular cavity 72 between the top face 62 and the bottom face 66 around the flow aperture 64. The bottom face 66 does not extend past a lower rim 74 of the bottom side of the cap body outside the thread depression 22 for protection. The electronics housing 60 has a cylindrical inlet port extension 76 extending from the bottom face 66 around the flow aperture 64 past the lower rim 74 and a cylindrical outlet port extension 78 extending from the top face 62 around the flow aperture 64 into the principal aperture 28. The lower portion 32 has a diameter conforming to an outer diameter of the outlet port extension 78. The outlet port extension 78 extends past the lower portion 32 and into the stopper 40. The stopper 40 has an inner diameter conforming to the outer diameter of the outlet port extension 78.

Figure 5:
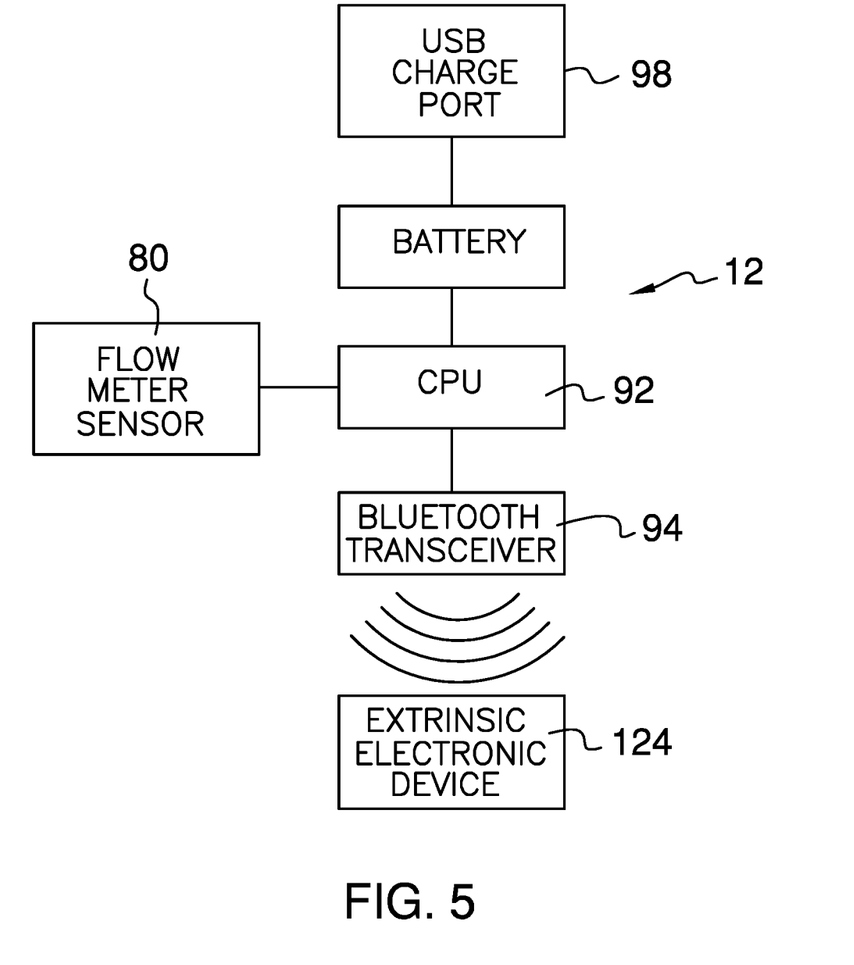
FIG. 5 is a block diagram of an embodiment of the disclosure.

A flow meter 80 is coupled to the electronics housing 60. The flow meter 80 comprises a sensor body 82, an axle 84 rotatively coupled to the sensor body 82, and a shredder bar 86 fixedly coupled to the axle 84. The sensor body 82 is coupled within the cavity 72 and the axle 84 is rotatingly coupled within an axle aperture 88 extending from the cavity 72 through the electronics housing 60 into the flow aperture 64. The shredder bar 86 has four perpendicular blades 90 and is disposed within the flow aperture 64. The blades 90 are configured to rotate the axle 84 under the flow of a liquid. The flow meter 80 is configured to detect a volume of fluid flowing through the flow aperture 64 from the bottom face 66 to the top face 62. A CPU 92, a transceiver 94, and a battery 96 are coupled to the electronics housing 60 within the cavity 72. The CPU 92 is in operational communication with the flow meter 80. The transceiver 94 and the battery 96 are in operational communication with the CPU 92. A charge port 98 is coupled to the electronics housing 60 extending from the cavity 72 through to a port recession 100 of the bottom face. The annular cavity 72 may be adjacent the top face 62 to provide more of the electronics housing 60 for the charge port 98 to rest within for structural integrity. The charge port 98 is in operational communication with the battery 96 and may be a micro USB or other standard port configured to receive a charging cable.

Figure 3:
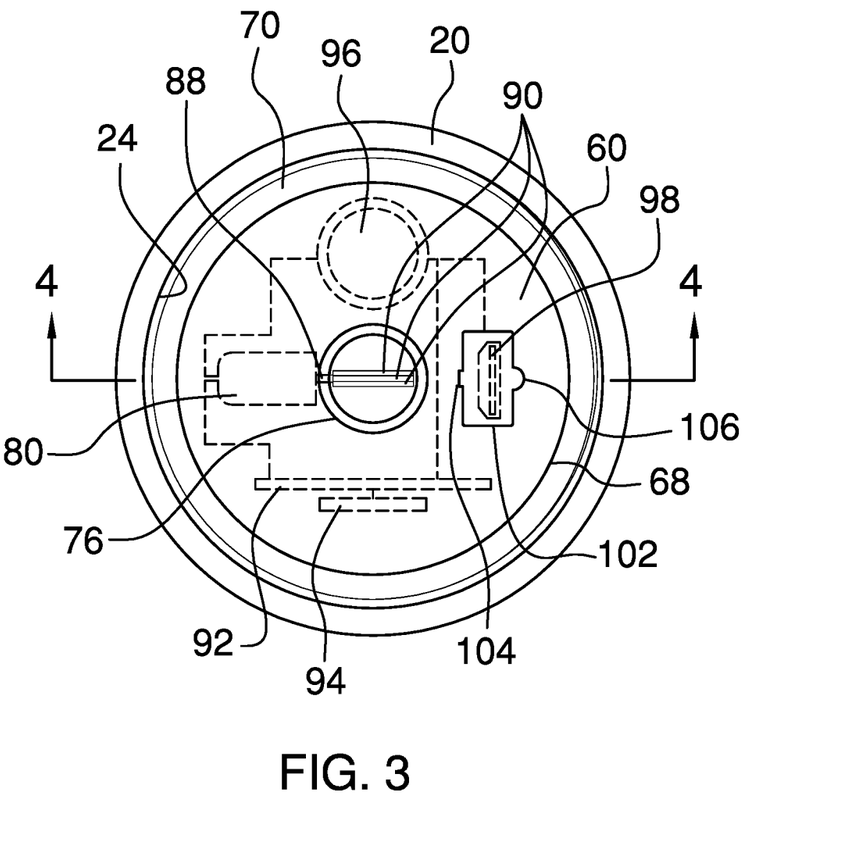
FIG. 3 is a bottom plan view of an embodiment of the disclosure.

A watertight port cover 102 is coupled to the electronics housing 60 and selectively engages the port recession 100. The port cover 102 sealingly covers the charge port 98 when engaged to prevent fluid from entering the cavity 72. The port cover 102 may be rectangular and has a hinge extension 104 and a lift tab extension 106 opposite the hinge extension 104. The lift tab extension 106 may be semicircular. The hinge extension 104 is coupled to the bottom face 66 and the lift tab extension 106 is configured to assist a user in disengaging the port cover 102 from the port recession 100.

Figure 1:
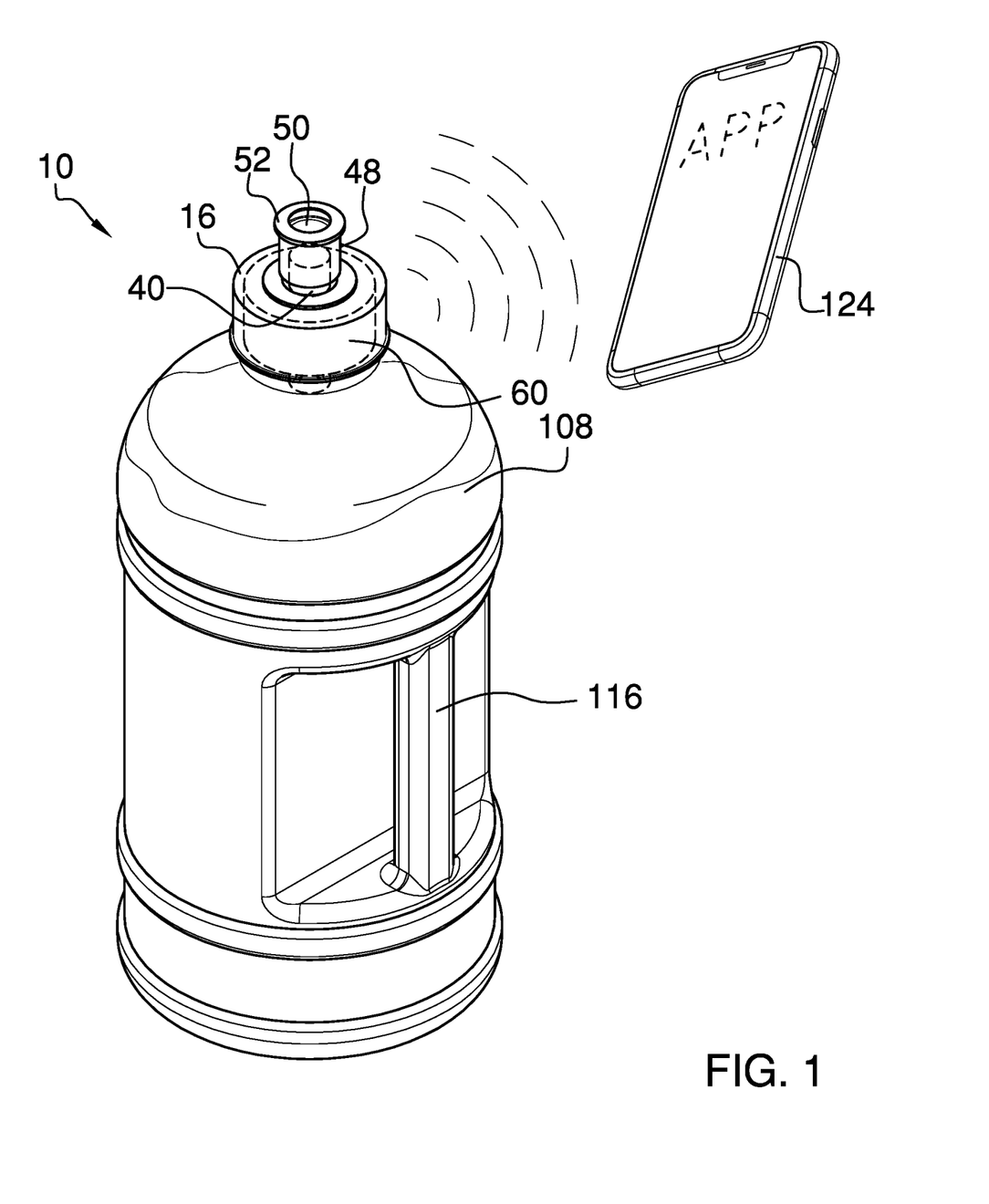
FIG. 1 is an isometric view of a flow meter water cap system according to an embodiment of the disclosure.
Figure 2:
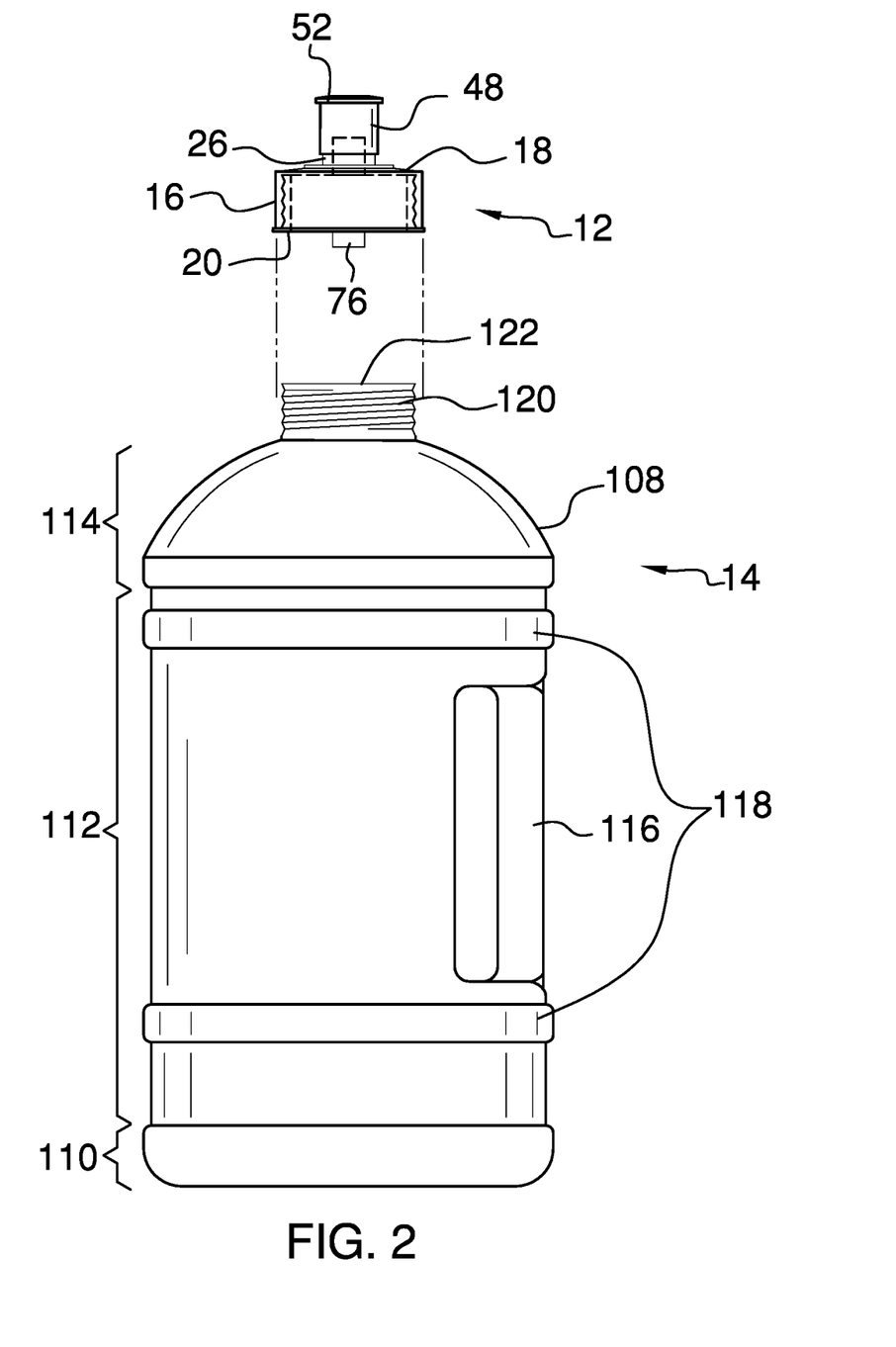
FIG. 2 is a side elevation view of an embodiment of the disclosure.

The bottle vessel 14 comprises a bottle body 108 having a base section 110, a medial section 112, and a rounded top section 114. The medial section 112 has an integrated handle 116 and a pair of grip ridges 118 on either side of the handle 116 to easily secure the bottle vessel 14. The top section 114 has a neck 120 and a bottle aperture 122 extending through the neck 120. The neck 120 is externally threaded and is selectively engageable with the thread depression 22 within the bottle channel 70.

In use, the bottle body 108 is configured to store a liquid content and release said content through the flow aperture 64, the principal aperture 28, and ultimately the top aperture 50 when the cap body 16 is engaged and the cap top 48 is in the open position. The transceiver 94 is configured to be in wireless communication with an extrinsic electronic device 124 such as a smartphone to share information from the flow meter 80 and the battery 96 to allow the user to track her fluid consumption and to know when to recharge the battery 96.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A flow meter water cap system comprising:
   a bottle cap apparatus comprising:
   a cap body, the cap body having a top side and a bottom side, the bottom side having a circular thread depression extending towards the top side, an inner face of the thread depression being threaded, the top side having a central spout extension and a principal aperture extending from the bottom side through the spout extension;
   a cylindrical stopper coupled to the cap body, the stopper being coupled within the principal aperture and extending above the spout extension;
   a cap top coupled to the cap body, the cap top being slidingly coupled around the spout extension and selectively engageable with the stopper to seal and alternatively unseal the principal aperture when the cap top is in a closed position and an alternative open position, respectively;
   an electronics housing coupled to the cap body, a top face of the electronics housing being coupled to the bottom side within the thread depression and having a flow aperture extending from a bottom face through the top face aligned with the principal aperture, the electronics housing having an annular cavity between the top face and the bottom face around the flow aperture;
   a flow meter coupled to the electronics housing, the flow meter comprising a sensor body, an axle coupled to the sensor body, and a shredder bar coupled to the axle, the sensor body being coupled within the cavity and the axle being rotatingly coupled within an axle aperture extending from the cavity through the electronics housing into the flow aperture, the shredder bar being disposed within the flow aperture, the flow meter being configured to detect a volume of fluid flowing through the flow aperture from the bottom face to the top face;
   a CPU coupled to the electronics housing, the CPU being coupled within the cavity and in operational communication with the flow meter;
   a transceiver coupled to the electronics housing, the transceiver being coupled within the cavity and in operational communication with the CPU;
   a battery coupled to the electronics housing, the battery being coupled within the cavity and in operational communication with CPU; and
   a charge port coupled to the electronics housing, the charge port extending from the cavity through to the bottom face, the charge port being in operational communication with the battery;
   wherein the transceiver is configured to be in wireless communication with an extrinsic electronic device to share information from the flow meter and the battery; and
   at least one bottle vessel, each comprising:
   a bottle body, the bottle body having a neck extending from a top section and a bottle aperture extending through the neck, the neck being externally threaded and selectively engageable with the thread depression of the cap body, the bottle body being configured to store a liquid content and release said content through the flow aperture when the cap body is engaged and the cap top is in the open position.

2. The flow meter water cap system of claim 1 further comprising the electronics housing being cylindrical and defining an annular bottle channel between an outer face of the electronics housing and the inner face of the thread depression of the cap body.

3. The flow meter water cap system of claim 1 further comprising the bottom face of the electronics housing not extending past a lower rim of the bottom side of the cap body outside the thread depression, the electronics housing having a cylindrical inlet port extension extending from the bottom face around the flow aperture past the lower rim and a cylindrical outlet port extension extending from the top face around the flow aperture into the principal aperture.

4. The flow meter water cap system of claim 3 further comprising the principal aperture having a lower portion extending from the thread depression and an upper portion extending from the lower portion to an upper rim of the spout extension, the lower portion having a diameter conforming to an outer diameter of the outlet port extension and the upper portion being wider than the lower portion, the upper portion and the lower portion thus defining a shelf, the stopper being coupled to the shelf.

5. The flow meter water cap system of claim 4 further comprising the outlet port extension extending past the lower portion and into the stopper, the stopper having an inner diameter conforming to the outer diameter of the outlet port extension and an outer diameter less than a diameter of the upper portion, the stopper having a porous lower wall, an outer lip aligning with the upper rim of the spout extension, and a solid, closed upper wall extending past the spout extension, a central top aperture of a top end of the cap top having a diameter conforming to a diameter of the upper wall and selectively receiving the upper wall such that the top end rests on, and extends between, the outer lip and the upper rim of the spout extension when the cap top is in the closed position, the cap top in the closed position thus being configured to block the flow of water through the principal aperture, the cap top in the open position thus being configured to allow the flow of water from the flow aperture through the lower wall, between the upper portion and the outer lip, and out the central top aperture.

6. The flow meter water cap system of claim 1 further comprising the spout extension having a recessed lower section adjacent the top side, an inner lip extending from a bottom end of the cap top slidingly engaging the recessed lower section to contact the top side with the cap top in the closed position and to contact an upper section of the spout extension with the cap top in the open position, thus controlling the range of motion of the cap top and preventing the cap top from accidently disengaging the spout extension.

7. The flow meter water cap system of claim 1 further comprising a watertight port cover coupled to the electronics housing, the watertight port cover selectively engaging a port recession of the bottom face, the charge port extending to the port recession and being sealingly covered by the port cover when engaged.

8. The flow meter water cap system of claim 7 further comprising the port cover being rectangular and having a hinge extension and a lift tab extension opposite the hinge extension, the hinge extension being coupled to the electronics housing and the lift tab extension being configured to assist a user in disengaging the port cover from the port recession.

9. The flow meter water cap system of claim 1 further comprising the cavity of the electronics housing being adjacent the top face.

10. The flow meter water cap system of claim 1 further comprising the shredder bar having four perpendicular blades.

11. The flow meter water cap system of claim 1 further comprising the bottle body having a base section, a medial section, and a top section, the medial section having an integrated handle.

12. The flow meter water cap system of claim 1 further comprising the top section being rounded and the medial section having a pair of grip ridges on either side of the handle.

13. A flow meter water cap system comprising:
a bottle cap apparatus comprising:
  a cap body, the cap body having a top side and a bottom side, the bottom side having a circular thread depression extending towards the top side, an inner face of the thread depression being threaded, the top side having a central spout extension and a principal aperture extending from the bottom side through the spout extension, the spout extension having a recessed lower section adjacent the top side, the principal aperture having a lower portion extending from the thread depression and an upper portion extending from the lower portion to an upper rim of the spout extension, the upper portion being wider than the lower portion, the upper portion and the lower portion thus defining a shelf;
  a cylindrical stopper coupled to the cap body, the stopper being coupled within the principal aperture to the shelf and having an outer diameter less than a diameter of the upper portion, the stopper having a porous lower wall, an outer lip aligning with the upper rim of the spout extension, and a solid, closed upper wall extending past the spout extension;
  a cap top coupled to the cap body, the cap top being slidingly coupled around the spout extension and selectively engageable with the stopper to seal and alternatively unseal the principal aperture when the cap top is in a closed position and an alternative open position, respectively, a central top aperture of a top end of the cap top having a diameter conforming to a diameter of the upper wall and selectively receiving the upper wall such that the top end rests on, and extends between, the outer lip and the upper rim of the spout extension when the cap top is in the closed position, the cap top in the closed position thus being configured to block the flow of water through the principal aperture, the cap top in the open position thus being configured to allow the flow of water through the lower wall, between the upper portion and the outer lip, and out the central top aperture, an inner lip extending from a bottom end of the cap top slidingly engaging the recessed lower section to contact the top side with the cap top in the closed position and to contact an upper section of the spout extension with the cap top in the open position, thus controlling the range of motion of the cap top and preventing the cap top from accidently disengaging the spout extension;
  an electronics housing coupled to the cap body, a top face of the electronics housing being coupled to the bottom side within the thread depression and having a flow aperture extending from a bottom face through the top face aligned with the principal aperture, a cylindrical outer face defining an annular bottle channel with the inner face of the thread depression of the cap body, the electronics housing having an annular cavity between the top face and the bottom face around the flow aperture adjacent the top face, the bottom face not extending past a lower rim of the bottom side of the cap body outside the thread depression, the electronics housing having a cylindrical inlet port extension extending from the bottom face around the flow aperture past the lower rim and a cylindrical outlet port extension extending from the top face around the flow aperture into the principal aperture, the lower portion having a diameter conforming to an outer diameter of the outlet port extension, the outlet port extension extending past the lower portion and into the stopper, the stopper having an inner diameter conforming to the outer diameter of the outlet port extension;
  a flow meter coupled to the electronics housing, the flow meter comprising a sensor body, an axle coupled to the sensor body, and a shredder bar coupled to the axle, the sensor body being coupled within the cavity and the axle being rotatingly coupled within an axle aperture extending from the cavity through the electronics housing into the flow aperture, the shredder bar having four perpendicular blades and being disposed within the flow aperture, the flow meter being configured to detect a volume of fluid flowing through the flow aperture from the bottom face to the top face;
  a CPU coupled to the electronics housing, the CPU being coupled within the cavity and in operational communication with the flow meter;
  a transceiver coupled to the electronics housing, the transceiver being coupled within the cavity and in operational communication with the CPU;
  a battery coupled to the electronics housing, the battery being coupled within the cavity and in operational communication with CPU;
  a charge port coupled to the electronics housing, the charge port extending from the cavity through to the bottom face, the charge port being in operational communication with the battery; and
  a watertight port cover coupled to the electronics housing, the watertight port cover selectively engaging a port recession of the bottom face, the charge port extending to the port recession and being sealingly covered by the port cover when engaged, the port cover being rectangular and having a hinge extension and a lift tab extension opposite the hinge extension, the hinge extension being coupled to the electronics housing and the lift tab extension being configured to assist a user in disengaging the port cover from the port recession;
  wherein the transceiver is configured to be in wireless communication with an extrinsic electronic device to share information from the flow meter and the battery; and
at least one bottle vessel, each comprising:
  a bottle body, the bottle body having having a base section, a medial section, and a rounded top section, the medial section having an integrated handle and a pair of grip ridges on either side of the handle, the top section having a neck and a bottle aperture extending through the neck, the neck being externally threaded and selectively engageable with the thread depression of the cap body, the bottle body being configured to store a liquid content and release said content through the flow aperture when the cap body is engaged and the cap top is in the open position.

\* \* \* \* \*